Patented Feb. 24, 1953

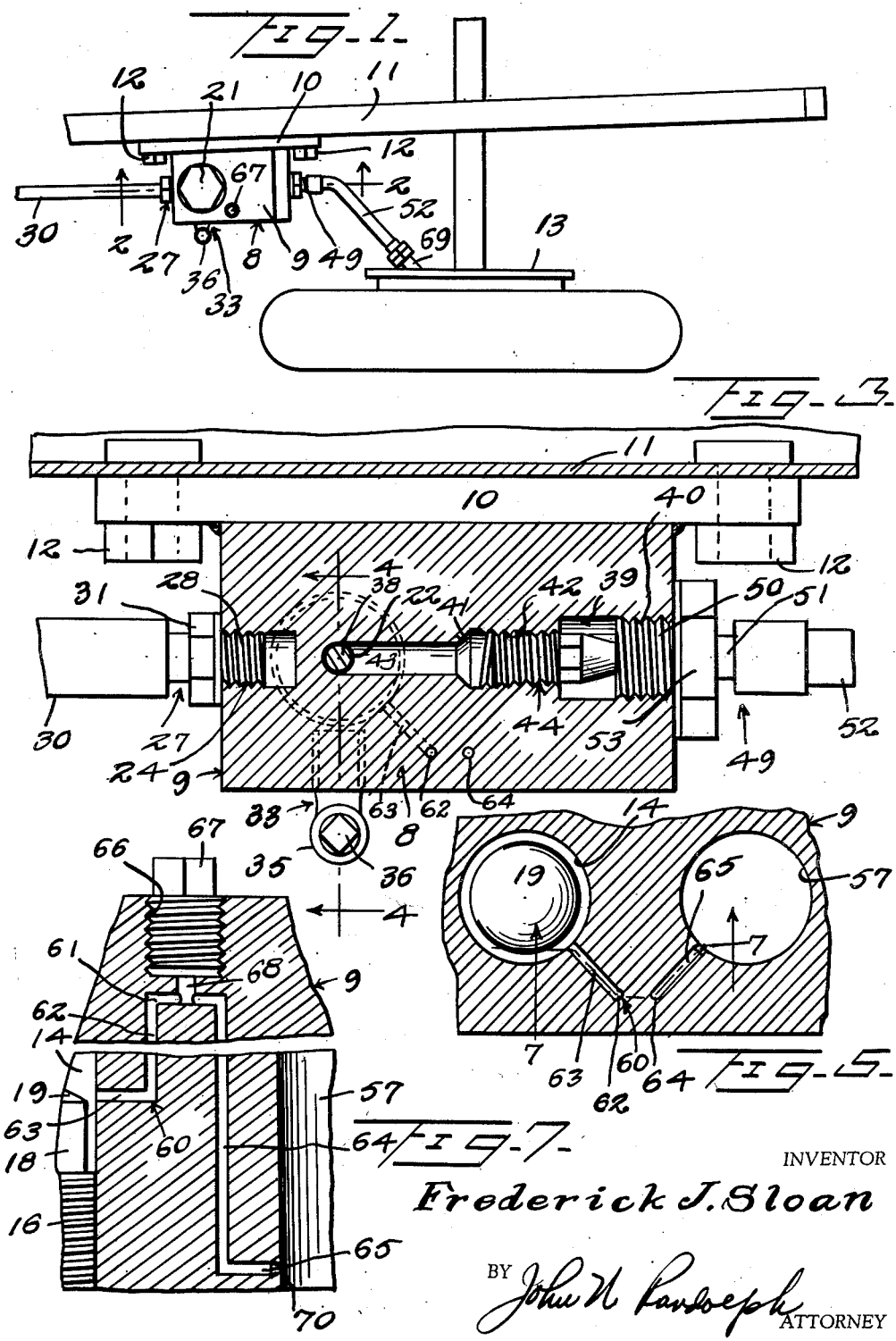

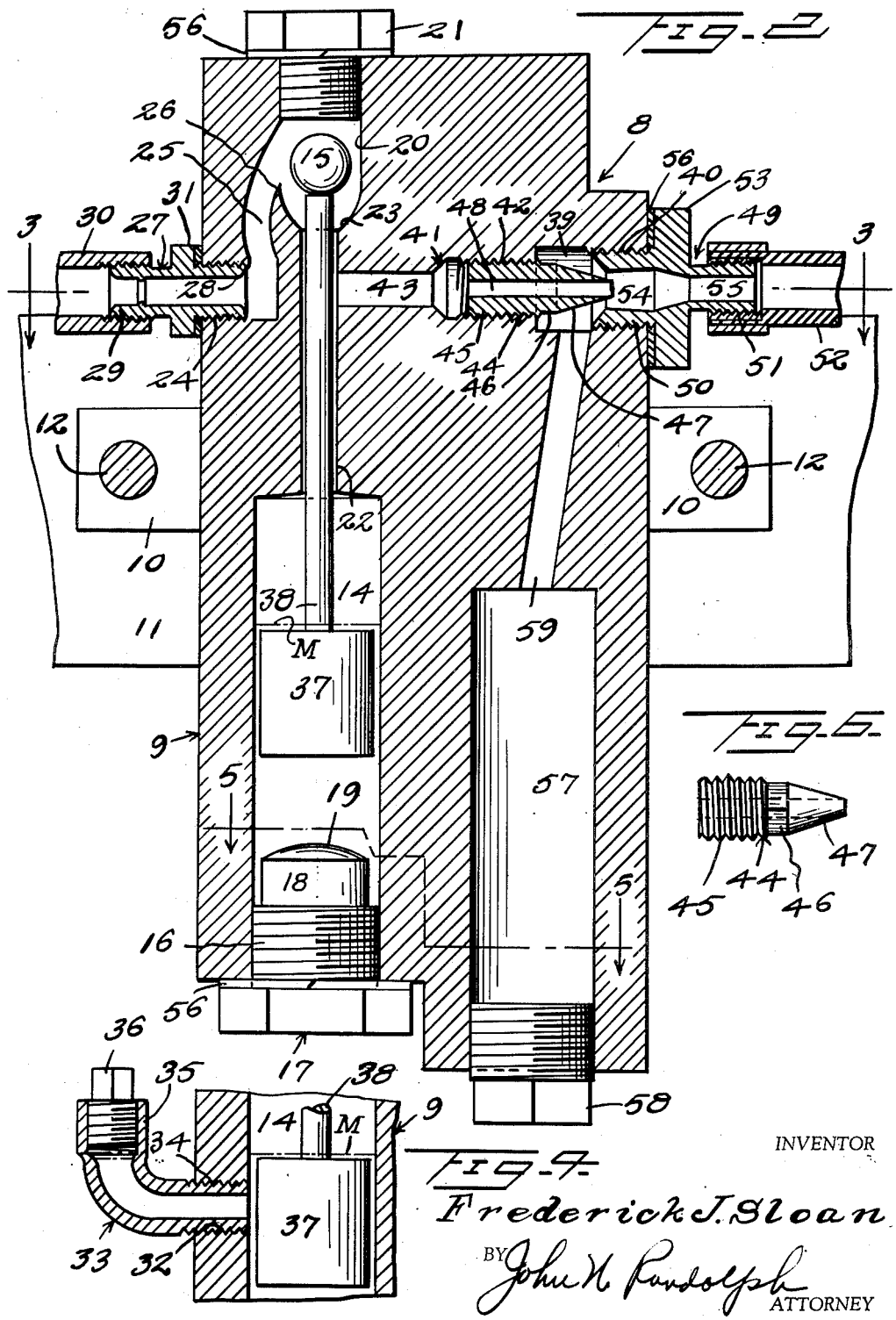

2,629,398

UNITED STATES PATENT OFFICE 2,629,398

AUTOMATIC HYDRAULIC SAFETY VALVE

Frederick J. Sloan, Charleston, W. Va.

Application May 16, 1952, Serial No. 288,184

8 Claims. (Cl. 137—460)

This invention relates to a novel form of hydraulic safety valve especially adapted for use in a line of a hydraulic brake system between a wheel cylinder and the master cylinder but which may likewise be utilized in any other type of hydraulic line having a back pressure.

More particularly, it is an aim of the present invention to provide an automatic safety valve of extremely simple construction capable of being mounted one between each wheel cylinder and master cylinder of a hydraulic brake system which will automatically close when pressure is forced through the valve toward a wheel cylinder if an inadequate pressure exists between the wheel cylinder and valve caused, for example, by a break in the hose leading from the valve to the wheel cylinder or a leakage therein or in the wheel cylinder.

More particularly, it is an aim of the invention to provide an automatic quick acting valve wherein closing of the valve can be accomplished ordinarily in less than two seconds after the brake pedal has been depressed to actuate the master cylinder for transmitting hydraulic pressure to the wheel cylinder.

Various other objects and advantages of the invention will hereinafter become more clearly apparent from the following description of the drawings, illustrating a presently preferred embodiment thereof, and wherein:

Figure 1 is a fragmentary top plan view of a portion of a motor vehicle showing the automatic hydraulic safety valve applied thereto adjacent one of the wheel brakes;

Figure 2 is an enlarged vertical sectional view taken substantially along a plane as indicated by the line 2—2 of Figure 1;

Figure 3 is a horizontal sectional view of the valve taken substantially along a plane as indicated by the line 3—3 of Figure 2;

Figure 4 is a fragmentary vertical sectional view taken substantially along a plane as indicated by the line 4—4 of Figure 3;

Figure 5 is a fragmentary horizontal sectional view taken substantially along a plane as indicated by the line 5—5 of Figure 2;

Figure 6 is a side elevational view of one element of the valve, shown detached, and Figure 7 is a fragmentary vertical sectional view taken substantially along a plane as indicated by the line 7—7 of Figure 5.

Referring more specifically to the drawings, the automatic hydraulic safety valve in its entirety is designated generally 8 and includes a vertically elongated casting or body 9 provided with a mounting bracket 10 which projects beyond opposite sides thereof and which is suitably secured to the casting 9. The mounting bracket 10 is secured to a suitable part of a motor vehicle, such as a longitudinal beam 11 of a vehicle chassis by means of fastenings 12 which extend therethrough and through the ends of the mounting bracket 10, for mounting the valve 8 adjacent a wheel brake 13 of the vehicle. As the description proceeds, it will be readily apparent that the valve 8 may be mounted in other suitable locations and that a valve 8 will be provided for each of the four wheel brakes, in the manner as illustrated in Figure 1.

The casting 9 contains a mercury storage chamber 14 which opens outwardly of the bottom of said casting, the lower end of which is threaded to receive the threaded portion 16 of a plug 17. Said plug is provided with a restricted stem 18 at the inner end of its threaded portion 16 having a convexly rounded upper free end 19. The casting 9 above the chamber 14 is provided with a chamber 20 opening outwardly of the top of said casting, the upper part of which is threaded to receive and be normally closed and sealed by a threaded plug 21. A bore 22, of a diameter less than that of the chambers 14 and 20, is formed in the casting 9 and is connected at its lower end to the upper end of the chamber 14 and its upper end to the lower end of the chamber 20. The chamber 20 has a concavely rounded or dished lower end forming a valve seat 23 around the upper end of the passage or bore 22 for seating a ball valve 15 which is disposed in the chamber 20 for closing the upper end of the bore 22 to prevent a hydraulic fluid from flowing into said bore from the chamber 20. The casting 9 is provided with an internally threaded inlet port 24 opening outwardly of one side wall thereof and extending inwardly therefrom toward the bore 22. A passage 25 in the casting 9 extends upwardly from the inner end of the inlet port 24 and is spaced from the bore 22. The upper end 26 of the passage 25 opens into the chamber 20 above the valve seat 23 and is elongated vertically so that said passage end 26 may not be closed by the ball valve 15, for a purpose that will hereinafter become apparent. An inlet nipple 27 has an externally threaded inner end 28 which is threaded into the inlet port 24 and an externally threaded outer end 29 which is threadedly connected to the outlet end of a conduit 30. The conduit 30 leads from the outlet of the master cylinder, not shown, of the hydraulic brake system. The nipple 27 is provided intermediate of its ends with a portion 31 having wrench lands for applying the nipple to the inlet port 24 and to the outlet end of the conduit 30.

As best seen in Figure 4, the casting 9 is provided with an internally threaded filling port 32 which opens outwardly thereof and into the mercury storage chamber 14, substantially above the plug portion 19 and substantially below the bore 22. A filling neck 33 comprising a pipe L has an externally threaded end 34 threaded into the filling port 32 and opening into the chamber 14 and an upstanding internally threaded enlarged opposite end 35 which is normally closed by a threaded plug 36. When the plug 36 is removed, the chamber 14 may be partially filled with mercury, as indicated at M in Figures 2 and 4, through the filling neck 33 preferably up to approximately the level of the bottom of the enlarged filling neck portion 35 (Figure 4). The chamber 14 also contains a float 37 which preferably is in the form of a solid aluminum body having a stem 38 fixed to and rising from its upper end and which extends upwardly through and is loosely disposed in the bore 22. The float 37 is normally supported by the mercury M in the storage chamber 14, so that the upper portion of the float stem 38 will be disposed in the lower part of the chamber 20 to support the ball valve 15 in an open position above and out of engagement with the valve seat 23.

The casting 9 is provided with a relatively large outlet port 39 which preferably opens outwardly of a side wall of the casting opposite the side wall through which the inlet port 24 opens. The outlet port 39 is provided with an internally threaded outer part 40. A passage, designated generally 41 is formed in the casting 9, preferably at substantially a right angle to the bore 22 and has an enlarged internally threaded end 42 opening into the inner unthreaded end of the outlet port 39, and a restricted opposite end 43 which opens into the bore 22 between the valve seat 23 and the storage chamber 14. The passage 41 is substantially smaller in diameter than the outlet port 39.

A jet, designated generally 44 in the form of an elongated sleeve of circular cross section, has an externally enlarged externally threaded end 45 which is threaded into the enlarged threaded passage end 42. The jet 44 is provided with a squared intermediate portion 46 forming wrench lands for applying the portion 45 to and for removing it from threaded engagement with the passage end 42. An opposite end portion 47 of the jet 44 is tapered from the squared intermediate portion 46 to its terminal. The jet 44 has a central bore or passage 48 extending therethrough from end-to-end thereof.

An outlet nipple, designated generally 49, is provided with an externally threaded inner end 50 which is threaded into the portion 40 of the outlet 39 after application of the jet 44. The nipple 49 is provided with an opposite externally threaded outer end 51 which is adapted to be connected to one end of a wheel brake hose or conduit 52. The nipple 49 has an enlarged noncircular intermediate portion 53 providing wrench lands for receiving a tool for applying the nipple to the outlet portion 40 and for holding the nipple while the hose 52 is applied thereto. The inlet end 50 and said intermediate portion 53 are provided with a bore 54 forming a Venturi passage, into the flared inlet end of which the terminal portion of the tapered outlet end 47 of the jet 44 extends, as clearly illustrated in Figure 2. The outlet end portion 51 has a substantially straight bore 55 extending therethrough forming a communicating passage between the restricted outlet end of the Venturi passage 54 and the bore of the hose or conduit 52.

The plugs 17 and 21 are provided with compressible metal gaskets 56 located between the heads of said plugs and the casting 9, and the outlet nipple 49 is likewise provided with a compressible metal gasket 56 between its intermediate portion 53 and the casting 9.

The casting 9 is provided with a vertically elongated chamber 57, the lower end of which opens outwardly of the bottom of said gasket and which is normally closed by a plug 58 which is threaded therein. A restricted bore or passage 59 communicates with the upper end of the chamber 57 and extends upwardly therefrom and communicates at its upper end with the unthreaded portion of the outlet 39, beyond the inner end 50 of the nipple 49. A conduit, designated generally 60, is formed in the casting 9 between the chambers 14 and 57 and includes a horizontal intermediate upper portion 61 located beneath and adjacent the top of the casting 9 having a shorter leg 62 extending downwardly from one end thereof and provided with an outturned lower portion 63 which opens into the chamber 14 near its bottom and adjacent the rounded upper end 19 of the stem 18, as best seen in Figure 7. A longer leg 64 extends downwardly from the opposite end of the intermediate portion 61 and has an outturned terminal 65 opening into the chamber 57 above the plug 58 but below the level of the opposite end 63. The upper part of the casting 9 is provided with an upwardly opening threaded well 66 which is normally closed or sealed by a threaded plug 67. A short passage 68 extends between the bottom of the well 66 and the intermediate portion 61.

The storage chamber 14 contains mercury M up to approximately the level of the bottom of the enlarged filling neck portion 35 and that the remainder of said chamber 14, the chamber 57 and the siphon conduit 60 are filled with the brake fluid. The float 37 will be lifted by the mercury in chamber 14 to its position of Figure 2 for supporting the ball valve 15 out of engagement with the valve seat 23, as illustrated in Figure 2. Accordingly, when the brake pedal, not shown, is depressed to actuate the master cylinder, not shown of the brake system, hydraulic fluid will be forced under pressure through the conduit 30, inlet nipple 27 and passage 25 into the chamber 20, through the bore 22 and passage 41, and then through the jet 44 and the outlet nipple 49 into the hose 52. This will normally be accomplished without affecting the fluid in chambers 14 and 57. The other end of the hose 52, as illustrated in Figure 1, is connected to the inlet nipple 69 of the cylinder, not shown, of the wheel brake 13, so that the brake 13 is applied. Each of the other wheel brakes of the vehicle is similarly equipped with a valve 8 and so long as no leakage exists between the valve 8 and the cylinder of the wheel brake 13, associated therewith, the valve 8 will be maintained in its open position of Figure 2 and will not affect the flow of the brake fluid under pressure to the wheel cylinder or the return of the fluid therefrom. However, should a leak occur anywhere between the valve 8 and the wheel brake 13, as for example in the hose 52 or in the cylinder to which the hose is connected, the normal pressure of the hydraulic fluid in the hose 52 will thus be diminished. Consequently, when the brake is again applied the hydraulic fluid will flow under greater velocity through the jet 44 due to the fact that less back pressure exists in the hose 52 and outlet nipple 49. Accordingly, the Venturi passage 54 will cooperate with the discharge end of the jet 44 to create a suction on the brake fluid in the inner end of the outlet port 39 and consequently in the passage 59 and mercury receiving chamber 57. The suction thus created in the chamber 57 will produce a suction on the brake fluid in the siphon conduit 60 and on the mercury in the conduit portion 63, causing the mercury to be drawn upwardly through the siphon leg 62 and downwardly through the longer siphon leg 64 into the mercury receiving chamber 57. At the same time the pressure is increased in chamber 14 to force the mercury through the siphon tube toward the chamber 57. The outturned end 65 of the leg 64 is provided with a restricted discharge end 70 forming a surge orifice opening into the chamber 57 through which the mercury is discharged into said chamber. The flow of the mercury into the chamber 57 and the withdrawal of the mercury from the storage chamber 14 will allow the float 37 to move downwardly carrying with it the float stem 38, thus permitting the ball valve 15 to seat in and close the valve seat 23 and the upper end of the bore 22 to stop the passage of the hydraulic brake fluid, not shown, under pressure through the valve 8 toward the wheel brake 13. Thus, the valve 8 will prevent additional brake fluid from escaping from the brake system through the leak between the valve 8 and the wheel brake 13. The brake shoes of hydraulic brake systems are equipped with strong springs to urge them to retracted positions away from the brake drums when the operator releases the brake pedal. Accordingly, the brake shoes are retracted very rapidly and the wheel cylinder rubber cups or pistons are likewise rapidly displaced toward one another thus causing a sudden rush of the brake fluid from each wheel cylinder through the hose 52 and into the hydraulic safety valve 8. This sudden surge of brake fluid toward the outlet end of the jet 44, due to the restricted size of said jet, is diverted through the passage 59 into the receiving chamber 57. In order that this sudden pressure will not be transmitted to the mercury through the siphon conduit 60 and which would cause a disturbance in the mercury which in turn would cause an unnecessary movement of the float valve 37, stem 38 and ball valve 15, restricted surge orifice 70 is provided to materially restrict the entrance of the brake fluid under pressure from the chamber 57 into the siphon conduit 60.

It will be apparent that no suction can be created in the bore 59 and chamber 57 while normal pressure exists in the hose 52 since a pressure is thus normally maintained in the chamber 57 and passage 59 corresponding to the pressure in the hose 52. Furthermore, as previously mentioned, the passage end 26 is shaped so that it may not be closed by the ball valve 15 and thus will not interfere with the return flow of the hydraulic fluid through the valve 8 and its nipple 27 back into the conduit 30.

After the valve 8 has been actuated by a leakage for closing the connection between the conduit 30 and hose 52, and after the leak has been located and eliminated, the plug 21 and plug 67 are loosened or removed to vent the passages of the valve which communicate with the chamber 20 and the siphon conduit 60. A container, not shown, is then placed beneath the chamber 57 and the plug 58 is removed for salvaging the mercury from the chamber 57. The plug 58 is then re-applied to seal the bottom of the chamber 57, after which the plug 36 is removed and the storage chamber 14 is refilled with mercury through the filling neck 33 up to the proper level, previously mentioned, to cause the float 37 to resume its position of Figure 2 so that its stem 38 will support the valve 15 in an open position. The plugs 21, 36 and 67 are then re-applied and the valve is then ready to again function in the manner as previously described.

The closing of the valve as previously described, upon actuation of the brake pedal where a leak exists, is accomplished in less than two seconds so that a minimum amount of the brake fluid is lost. However, the supply of brake fluid should be replenished if found necessary after repairing the leak and resetting the valve 8 in an open position. The convexly rounded stem end 19 will support the float 37 so as to prevent it from closing the siphon end 63.

Various modifications and changes are contemplated and may obviously be resorted to, without departing from the spirit or scope of the invention as hereinafter defined by the appended claims.

I claim as my invention:

1. A normally open automatically closing safety valve adapted to be interposed in a line containing a hydraulic fluid under pressure comprising a valve body containing a passage having one end adapted to be connected to the supply end of a line containing a hydraulic fluid under pressure and forming the inlet end of said passage, the opposite end of said passage constituting the discharge end thereof being adapted to be connected to the other end of the line leading to a source to be supplied with the hydraulic medium and in which a pressure normally exists, said passage including an upwardly opening valve seat and a chamber disposed thereabove, a ball valve disposed in said chamber for engaging the valve seat for closing the passage to prevent flow of the medium under pressure through the passage from its inlet end toward its outlet end, a chamber adapted to contain mercury formed in the valve body, a float disposed in said chamber and normally supported by the mercury contained therein in an elevated position, a stem rising from said float and extending into said first mentioned chamber and normally supporting the ball valve in an elevated open position, Venturi means mounted in the outlet end of said passage, and conduit means connected to and communicating with the outlet of the passage at one end thereof and having an opposite end communicating with the mercury containing chamber, said conduit means including a siphon portion extending substantially above the level of the mercury containing chamber whereby when the pressure is diminished in the outlet end of the passage and the fluid medium is forced under pressure through the passage toward its outlet end, said Venturi means will create a vacuum in the conduit means for drawing the mercury through the conduit means from the mercury containing chamber to cause the float to be lowered in the mercury containing chamber carrying with it the float stem whereby the ball valve is permitted to close by gravity to stop flow of the fluid medium under pressure through the passage toward its outlet end.

2. A valve as in claim 1, said conduit means including a mercury receiving chamber disposed beneath the outlet end of the passage and communicating with one end of the siphon portion, the opposite end of said siphon portion communicating with the mercury containing chamber adjacent the bottom thereof and above the connection of the siphon portion to said mercury receiving chamber.

3. A valve as in claim 2, said valve body comprising a casting in which said mercury receiving chamber, said first mentioned chamber, said passage and conduit means are formed.

4. A valve as in claim 1, a jet member having a bore extending longitudinally therethrough, said jet member being detachably mounted in said passage and constituting a part thereof and having the tapered end disposed in the outlet of the passage, said Venturi means comprising a nipple having one end adapted to be detachably connected to the last mentioned portion of the line and having an opposite end detachably mounted in the outlet of the passage, said nipple having a bore extending therethrough from end-to-end thereof including an inner end portion forming a Venturi passage into which the externally tapered discharge end of said jet projects.

5. A normally open automatically closing hydraulic safety valve comprising a valve body having a passage extending therethrough including an inlet end adapted to be connected to a source of supply of a hydraulic medium under pressure and an outlet end adapted to be connected to a line to be supplied with the hydraulic medium under pressure and normally containing a hydraulic medium under pressure for maintaining a back pressure in said passage, said passage including an upwardly opening valve seat, a ball valve disposed in a part of said passage and closing the passage for the passage of the medium under pressure from its inlet to its outlet end when the ball valve is in engagement with the valve seat, a mercury containing chamber formed in said valve body, a float buoyantly supported in said chamber, a stem rising from said float and extending into said passage and normally supporting the ball valve in a raised open position out of engagement with the valve seat, Venturi means disposed in the passage adjacent its outlet end, and conduit means formed in the valve body including a siphon portion extending to above the mercury containing chamber, said conduit means being connected to the outlet end of the passage and to the lower part of said mercury containing chamber for siphoning the mercury from said chamber to allow the float to drop to permit the ball valve to close by gravity when a pressure drop occurs in the outlet end of the passage beyond said Venturi means and when a suction is thereby created in the conduit means by the medium under pressure passing through the Venturi means and outwardly through the outlet end of the passage.

6. A valve as in claim 5, said valve body comprising a casting, and said Venturi means comprising a jet element and a nipple element detachably mounted in said passage.

7. A valve as in claim 5, said valve body having a normally closed drainage port for draining the mercury from said conduit means, and a normally closed vent port communicating with the upper end of the siphon portion of said conduit means for venting the conduit means while the drainage port is open.

8. A valve as in claim 5, means for refilling said mercury containing chamber, and an upwardly opening normally closed vent port communicating with an uppermost part of said passage for venting the passage during refilling of the mercury containing chamber.

FREDERICK J. SLOAN.

REFERENCES CITED

The following references are of record in the file of this patent:

UNITED STATES PATENTS

| Number | Name | Date |
| --- | --- | --- |
| 2,072,314 | Rhodes | Mar. 2, 1937 |
| 2,169,462 | De Grace | Aug. 15, 1939 |

FOREIGN PATENTS

| Number | Country | Date |
| --- | --- | --- |
| 493,760 | Great Britain | of 1938 |